(No Model.) 2 Sheets—Sheet 1.

J. KEYS.
CORN PLANTER.

No. 470,762. Patented Mar. 15, 1892.

Witnesses
Helen Graham
William Graham

Inventor
John Keys.
by his attorney
L. P. Graham (No Model.) 2 Sheets—Sheet 2.

J. KEYS.
CORN PLANTER.

No. 470,762. Patented Mar. 15, 1892.

Witnesses
Helen Graham
William Graham

Inventor
John Keys.
by his attorney
L. P. Graham

UNITED STATES PATENT OFFICE.

JOHN KEYS, OF SPRINGFIELD, ILLINOIS.

CORN-PLANTER.

SPECIFICATION forming part of Letters Patent No. 470,762, dated March 15, 1892.

Application filed November 3, 1891. Serial No. 410,803. (No model.)

*To all whom it may concern:*

Be it known that I, JOHN KEYS, of Springfield, in the county of Sangamon and State of Illinois, have invented certain new and useful Improvements in Corn-Planters, of which the following is a specification.

This invention relates to automatic "check-row corn-planters," so called, the object being to plant corn in check-rows without the use of a check-row line and, incidentally, to roll the ground while planting.

To this end the invention consists in a combined planter and roller, the roller being used to sustain the weight of the driver after the manner of covering-wheels ordinarily used.

It also consists in a lever adapted to actuate the shake-bar of the planter and a tappet-bar rotatingly adjustable with relation to the rollers and adapted to oscillate the lever by striking it alternately on opposite sides.

It further consists in a point or arrow held against spring-pressure in line with the dropping mechanism, or nearly so, and a trip adapted to be actuated by or simultaneously with the action of the dropping mechanism whenever the driver of the planter so desires. The last-mentioned device is intended to be operated at the last drop of the planter before turning at the ends of the field, and the arrow so released sticks in the ground in line with the last hills planted and forms a mark, whereby the planter may be easily put in check on its return.

Figure 1:
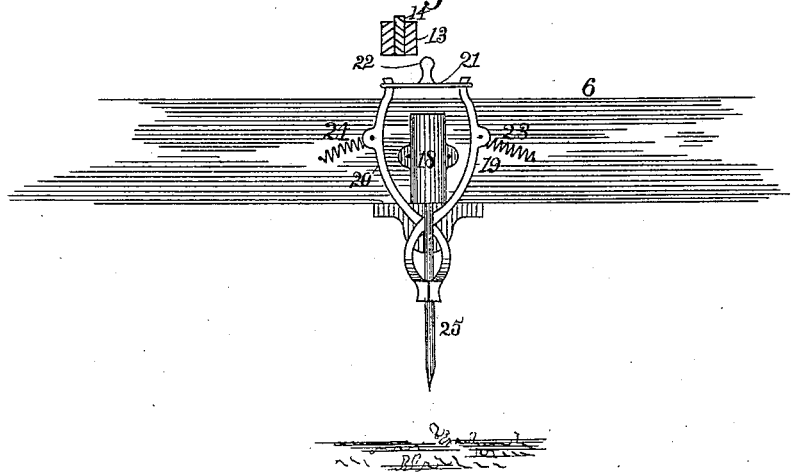
Figure 2:
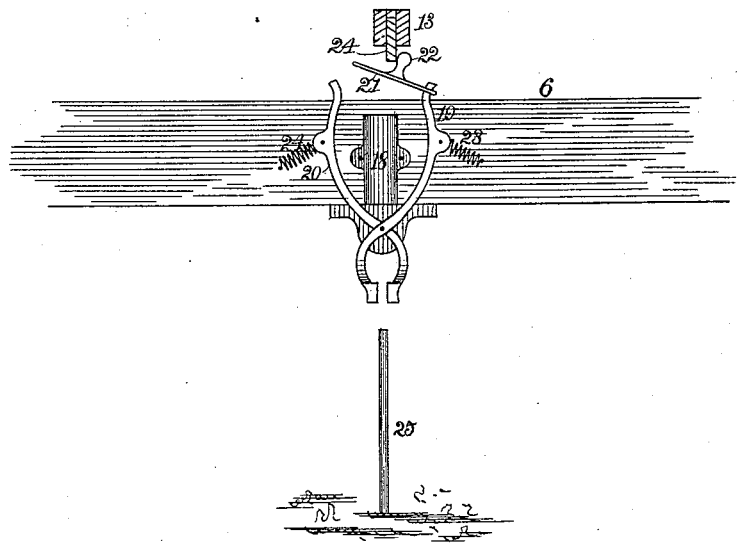
Figure 3:
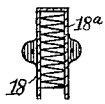
Figure 4:
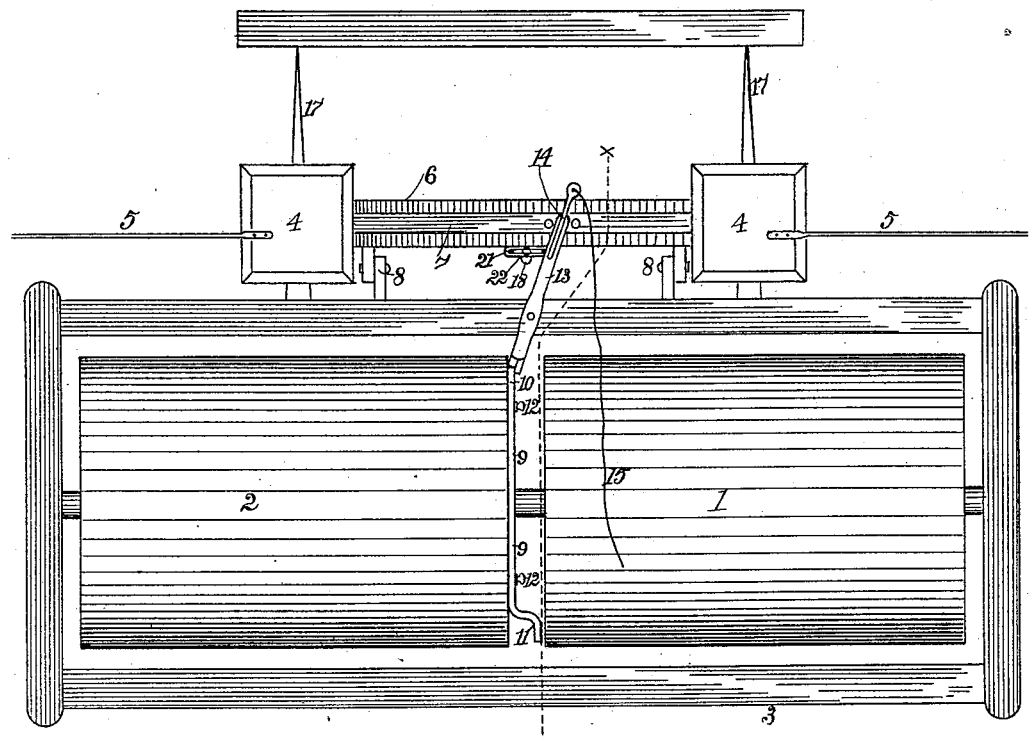
Figure 5:
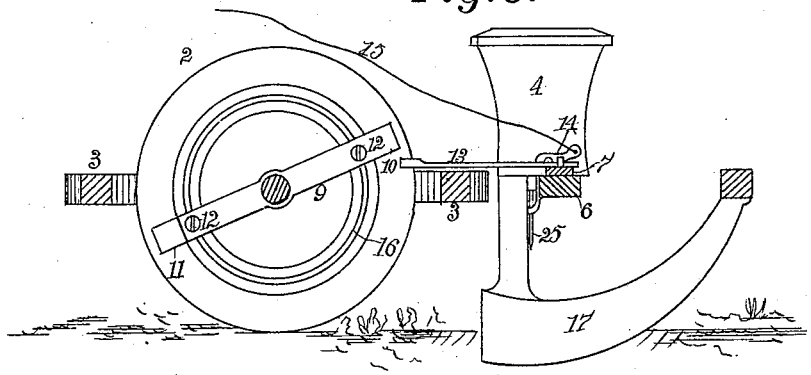

In the drawings accompanying and forming a part of this specification, Figures 1, 2, and 3 represent details of the arrow-operating mechanism. Fig. 4 is a plan of the essential features of a planter embodying my invention, and Fig. 5 is a section on line $x$ in Fig. 4.

The rollers 1 and 2 have a circumference equal to twice the distance between rows, they are slightly shorter than the distance between rows, and they are both mounted on a shaft which has bearings in frame 3.

The seed-boxes 4 are of the usual or of any desirable construction, and they have the customary dropping mechanism, which is adapted to be actuated by shake-bar 7. Pointers 5 are secured one to each seed-box and project laterally in line with the dropping mechanism of the planter.

6 is a cross-bar connecting the seed-boxes and carrying the arrow-discharging mechanism.

The roller-frame is connected pivotally at 8 with cross-bar 6. Lever 13 is connected pivotally with the front bar of the roller-frame. Its forward end extends between pins on the shake-bar and its rear end operates between the rollers. A weighted arm 14 pivots on the forward end of the lever and is adapted to move in a slot therein. Line 15 connects with the weighted end of the arm and extends rearward to a point readily accessible to the driver.

The runners of the planter are shown at 17, and they need be in no wise different from ordinary runners. One of the rollers has on its inner end a band provided with the annular slot 16. (Shown in Fig. 5.) A tappet-bar 9 is swung pivotally on the shaft of the rollers and is rotatingly adjustable by means of set-screws 12, which extend through slot 16 and engage heads on the opposite side thereof. They provide means for securing the tappet-bar in any desired position with relation to the roller.

A cylinder 18 is secured to the rear edge of bar 6 and provided with a spiral spring $18^a$, as seen in Fig. 3, where the cylinder is shown in section. The point or arrow 25 is inserted in cylinder 18 against the pressure of the spring, and is there held by the jaws of the arms 19 and 20. Link 21, placed over the ends of the arms, as seen in Fig. 1, hold the arrow against the action of the spring, and springs 23 and 24 tend to open the jaws and release the arrow whenever the link is removed. The weighted end of arm 14 tends to cause the opposite end to maintain the position with relation to the lever shown in Fig. 1, such lever and arm being therein shown in cross-section; but when an end of the field is reached the driver pulls on line 15, raising the weighted end and lowering the opposite end, and at the next swing of the lever the arm engages trip projection 22 of the link and releases the arrow, as seen in Fig. 2. The adjustment of the parts is such that the arrow penetrates the ground in line with the hills of corn last planted, the planter passes on, is turned into position to recross the field, and a pointer 5 is brought in line with the arrow. Then if the position of the tappet-bar is such that corn is dropped while the pointer and the arrow are in line the arrow is simply replaced in the cylinder, as shown in Fig. 1, and planting is resumed. In case the tappet-bar should not be in proper position when the pointer is in line with the arrow, it is adjusted by means of the set-screws and the slotted band. The tappet-bar has one end 10 lying close to one roller and the other end 11 close to the opposite roller. As the rollers rotate, the lever is struck alternately on opposite sides by opposite ends of the tappet-bar and is so oscillated. The rollers cover the corn in the customary manner and also improve the entire surface of the field.

In describing my invention I have shown only essential parts, leaving it to persons skilled in the art to supply adjuncts, such as a seat, tongue, a lever for raising the runners, &c.

I claim—

In corn-planters, the combination of dropping mechanism, an adjustable rotary tappet for operating the same, and an arrow adapted to be discharged to indicate the position of the hills of corn.

In testimony whereof I sign my name in the presence of two subscribing witnesses.

JOHN KEYS.

Attest:
L. P. GRAHAM,
E. N. WILLIAMSON.